June 24, 1930.  J. S. BACHMAN  1,767,957
MACHINE FOR CLEANING COTTON AND THE LIKE
Filed March 19, 1928   2 Sheets-Sheet 1
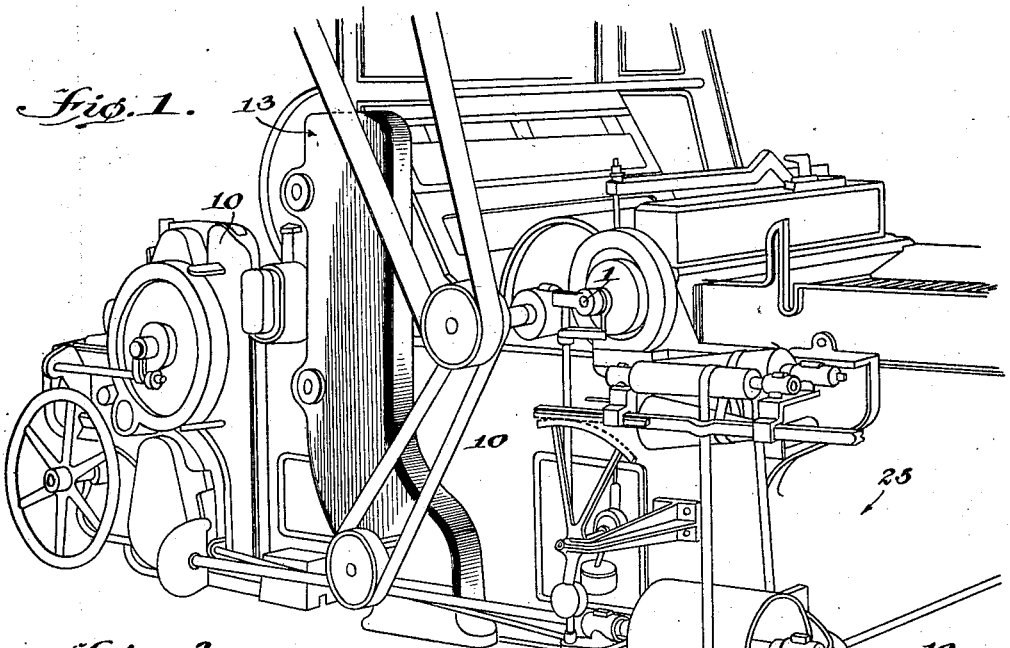
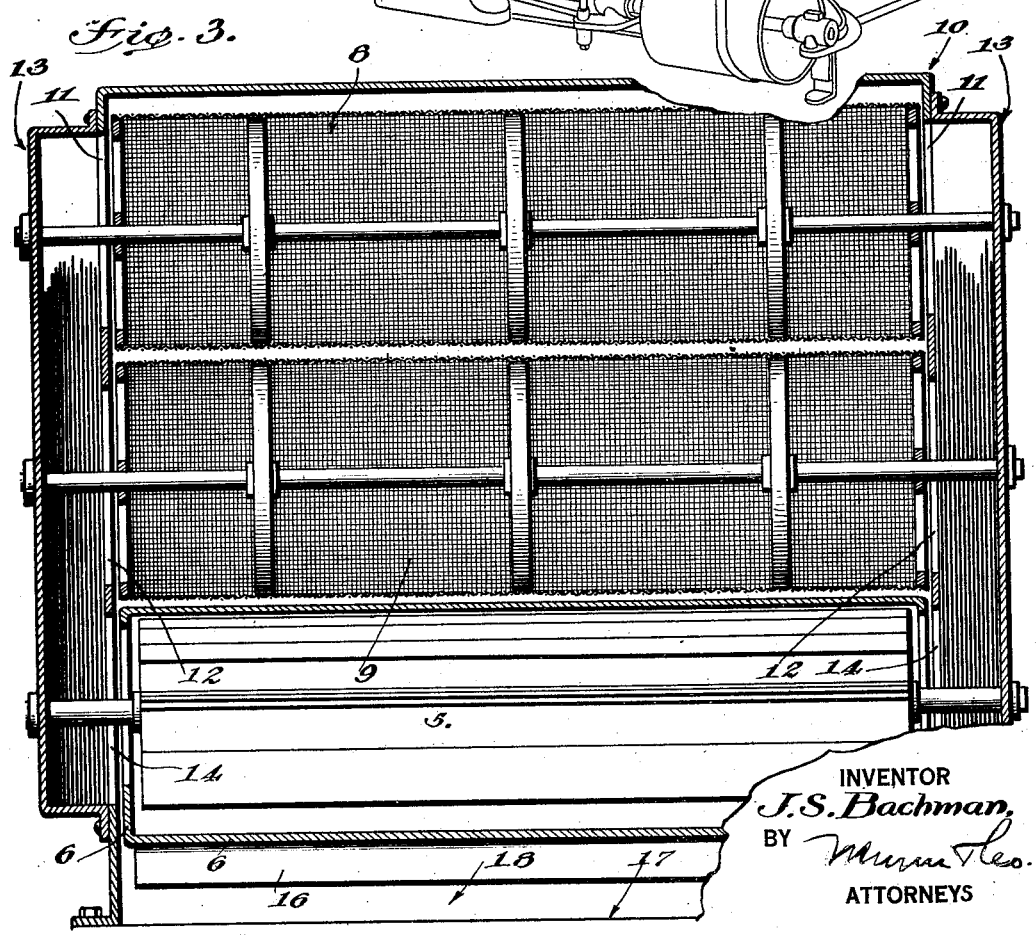
INVENTOR
J. S. Bachman,
BY
ATTORNEYS

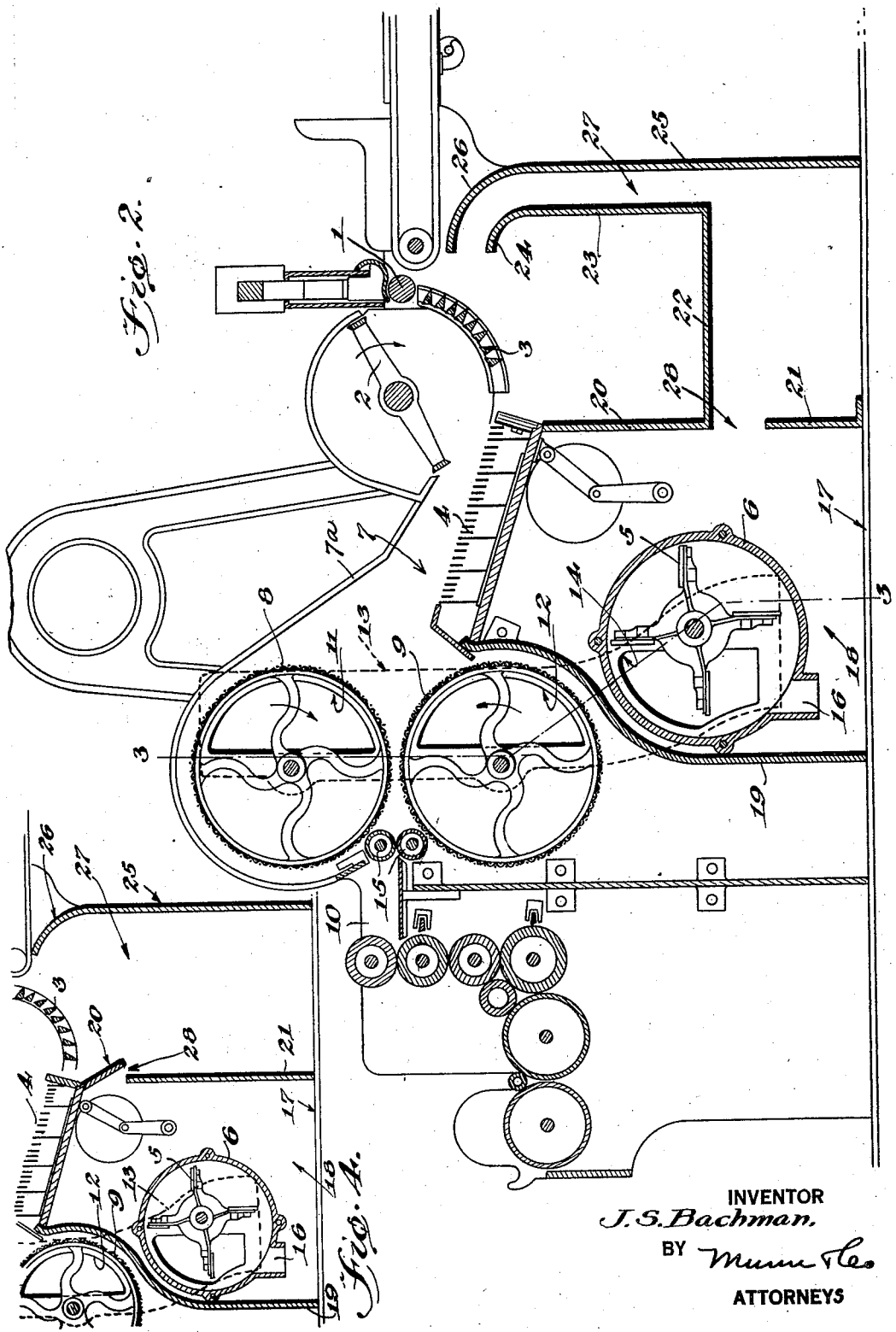

Patented June 24, 1930

1,767,957

UNITED STATES PATENT OFFICE

JOHN SNELGROVE BACHMAN, OF ROME, GEORGIA, ASSIGNOR TO ELWIN CHAPPELL, OF ATLANTA, GEORGIA

MACHINE FOR CLEANING COTTON AND THE LIKE

Application filed March 19, 1928. Serial No. 262,756.

This invention relates to improvements in cotton handling machinery, and it consists of the constructions, combinations and arrangements herein described and claimed.

An object of the invention is to improve that species of cotton handling machinery employing a current of air as one of the factors necessary to the performance of a particular operation, the specific improvement residing in the structure whereby said air current may be re-used repeatedly, thus insuring uniformity in the condition of the air, a more nearly even texture of the product, as well as other advantages disclosed later.

Another object of the invention, and one that closely follows the foregoing statement, is to continuously utilize the same current of air within a particular machine, so that the moisture content may be relied upon as being substantially uniform, and that the customary complete change of air at short intervals in the outside room, as in large mills, will be obviated.

Other objects and advantages appear in the following specification, reference being had to the accompanying drawings, in which—

Figure 1 is a perspective view of a portion of a breaker picker having the improvements incorporated therein;

Figure 2 is a longitudinal section of the structure in Figure 1;

Figure 3 is a detail cross section taken substantially on the line 3—3 of Figure 2;

Figure 4 is a detail longitudinal section illustrating a slight modification.

Although the invention is shown applied to what is known in the industry as a breaker picker, and the following description is devoted to this particular application of the invention, it must be understood that the principles of the latter are applicable to a wide variety of cotton handling machinery. The invention is capable of use with such types of machinery for handling cotton and other substances, as use a current of air as one of the factors in conducting the particular operation.

The function of the breaker picker, partially illustrated herein, is to break relatively large volumes of cotton into tufts so that the cotton may be handled more readily for the purpose of causing the removal of foreign matter, for example seeds, leaves, dirt, etc. As the cotton is thus broken by a beater the tufts are drawn against revolving screens or cages, through which much of the foreign matter is drawn and upon the surface of which the cotton tufts are distributed in layers which later are discharged from the machine in what is known as laps.

A brief description of the known parts of the breaker picker will make the foregoing discussion readily understood. Reference is made to Figure 2. A fringe of cotton is presented at the feed roll 1 to the rapidly rotating beater 2 which reduces the cotton to tufts. Some of the coarser particles of foreign matter will sift through the concave 3. The cotton passes over grid bars 4 at which the separation of coarser particles of foreign matter is continued.

A fan 5, operating within the casing 6, draws a current of air through the conduit 7 and through a pair of cages or screens 8 and 9, which conduit is defined by said grid bars and a cover 7ª. The cages are made to revolve in the directions indicated by the arrows. They extend full width of the machine frame, the sides of which are specifically designated 10.

Openings 11 and 12 in the sides 10 adjoining the ends of the cages 8 and 9 are connected by trunks or conduits 13 that extend to and cover openings 14 in the sides 10 adjacent to the ends of the fan 5. The turning of the fan will draw a current of air through the trunks 13, cages 8 and 9 and the conduit 7.

The tufts of cotton are thus attracted to the periphery of the cages. Layers will be formed, and these layers, when combined, are known as a lap. The layers of cotton are removed by stripping rolls 15, and the lap is conducted through a series of calender rolls prior to being wound upon a lap beam.

In drawing the cotton against the cages 8 and 9 the air current abstracts dust therefrom. The present practice is to connect the spout 16 of the fan casing 6 with a trunk or chute that leads to a dust room. Such room is usually located in the basement of the building, and the dust room ordinarily has a communicating chimney through which much of the dust is discharged into the outer atmosphere.

Inasmuch as both the dust room and chimney are now necessary accessories to a cotton mill considerable additional expense is involved in originally erecting the building. But a more important consideration resides in the use of the air. It is a fact that even in moderately large mills there will be a complete change of air in the picker room approximately every three minutes. The air is obviously drawn in from the picker room and discharged into the dust room. Fresh air must be obtained from the outside of the building, thus producing the complete change mentioned.

In dry weather the air will be lacking in the moisture content. In rainy weather the moisture content will be excessive. The moisture content will vary with intermediate kinds of weather. In any event the quality of the air passing through a breaker picker, arranged as at present, is subject to continuous variation. It is the purpose of the invention to obviate the latter effect, and to introduce several additional outstanding advantages.

The specific improvement is as follows:—
The sides 10 of the machine are either re-cast to provide additional height, or such structure is incorporated in existing machines as will permit the discharge of air from the fan casing 6 upon the floor 17. The spout 16 is now made to discharge into what is herein known as an equalization chamber 18. This chamber is defined by the original sides 10 of the machine, an original division plate 19, the grid bar 4, a partition 20 and baffle 21, the two latter being elements of the invention.

The partition 20 has an attached horizontal component 22 and a vertical component 23 that curves over as at 24. The adjacent end of the machine is closed by a closure plate 25, the upper end of which is curved at 26 to substantially agree with the curve 24. The components 20, 22, 23 and 24 are herein known as a partition. They define an air return passage 27, the mouth of which begins at an opening 28, defined by the edge of the baffle 21 and the adjacent curvature of the partition.

It is the purpose of the baffle 21 to prevent any considerable volume of dust or dirt from returning to the beater with the air current. The latter upon discharging into the chamber 18, seeks the opening 28 and flows through the passage 27, concave 3 of the beater, conduit 7, cages 8 and 9 and through the trunks 13 into the ends of the fan casing 6.

Figure 4 illustrates a slight modification wherein the air return passage 27 is formed in a slightly different way. All parts similar in nature to the structure in Figure 2 are similarly identified without a repetition of the description.

The various compartments of the partition are now omitted and only a single transverse plate 20 serves in place thereof. The baffle 21 is made somewhat higher so that the opening 28 occurs at a point somewhat farther from the floor. The partition 20 is shown slightly inclined. The entire space between the partition 20 and baffle 21 and the closure plate 25 constitutes the return passage or chamber.

The advantages of the improved structure are readily perceived. Substantially the same volume of air will be made to circulate within the machine. Very little air will be drawn in from the outside room. The moisture content will remain uniform because the same air is utilized continuously.

It follows that the cotton lap will be more even in texture because the circulating air remains in a uniform condition as regards humidity. The cotton lap is not affected by outside temperature changes, as is the case when fresh air is continuously drawn into the machine.

The use of the improvement enables humidity control by virtue of the foregoing circumstances. Most of the dust will be trapped between the walls 19 and 21 whence it may be removed through any ordinary provision. Coarser dirt falling upon the component 22 of the partition in Figure 2 may be similarly removed.

In conclusion it may be stated that such other machines in the cotton industry to which the principle of the invention may be applied, comprise jute pickers, wool pickers, cotton gins, waste pickers and various kinds of waste machinery. As has been stated already the principle is applicable to other types of machinery.

While the construction and arrangement of the improvement is that of a generally preferred form, obviously modifications and changes may be made without departing from the spirit of the invention or the scope of the claims.

I claim:—

1. In a machine of the character described comprising means to set a volume of air in motion, loading means including a beater and its concave by which fibrous material is loaded upon the air current, means to screen out the fibrous material and direct the unloaded air back into the current; means defining a conduit in which the air is continuously circulated, said means extending up to the extremities of and embracing the concave thus bridging the concave across the air conduit to receive the entire volume of air at full force.

2. In a machine of the character described comprising means to set a volume of air in motion, loading means including a concave and beater by which fibrous material is loaded upon the air current, means defining part of a conduit into which the air is circulated, means situated in said partial conduit to screen out the fibrous material and redirect the unloaded air into the current; means completing the conduit up to and to the extent of the concave thus isolating the concave in a bridging position across the current to receive the entire volume of air at full force.

3. In a machine of the character described, comprising means to set a volume of air in motion, loading means including a concave and beater by which fibrous material is loaded upon the air current, grid bars adjoining the concave to separate coarser particles of foreign matter, means to screen out the fibrous material; means defining an air conduit in which the volume of air is circulated, said means embracing and ending at the extremities of the concave thus isolating the grid bars from the direct air current and concentrating the entire volume of screened air against the concave at full force.

JOHN SNELGROVE BACHMAN.